2 Sheets—Sheet 1.
E. H. GRATIOT.
Grain-Heater.
No. 197,464. Patented Nov. 27, 1877.
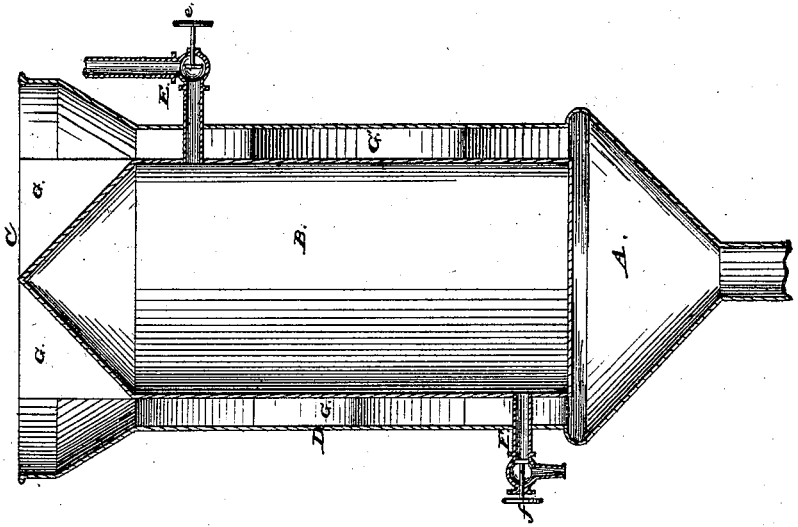
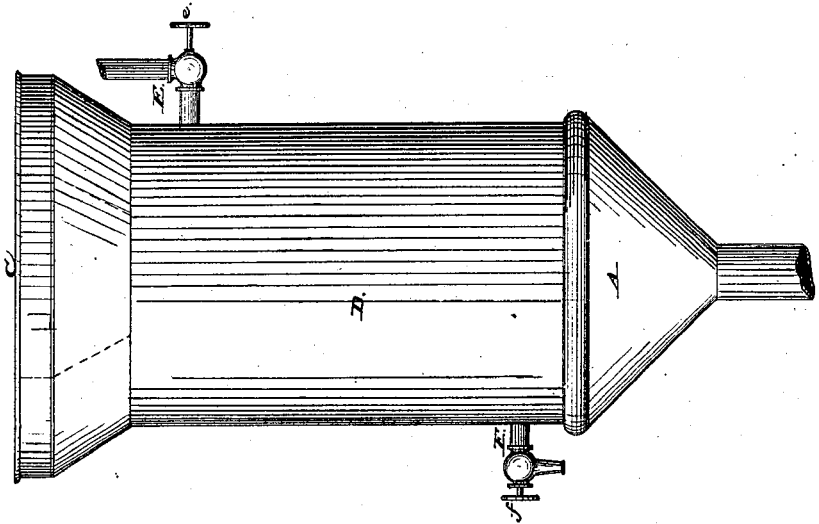
N. PETERS, PHOTO-LITHOGRAPHER, WASHINGTON, D.C.

2 Sheets—Sheet 2.
E. H. GRATIOT.
Grain-Heater.
No. 197,464. Patented Nov. 27, 1877.
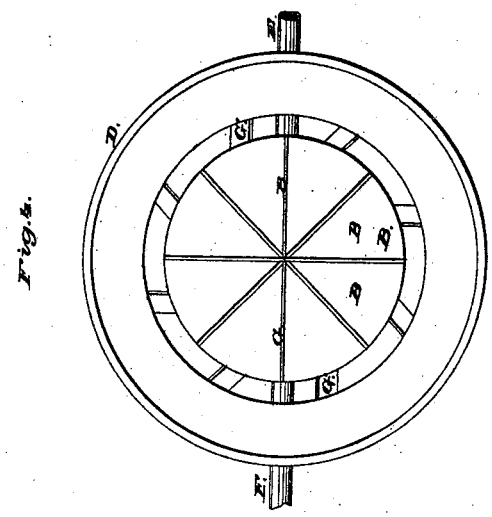
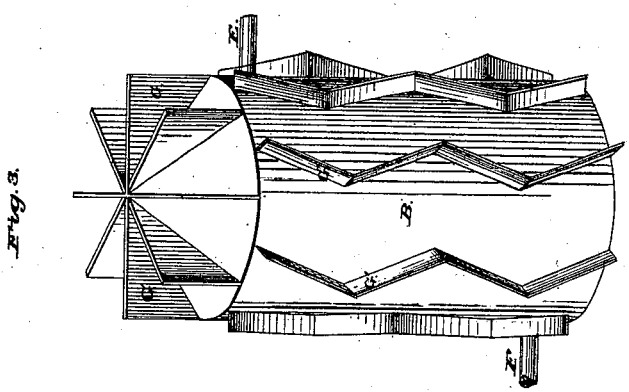
Witnesses:
Nathan E Utt
Matie Ellsworth
Inventor:
Edward Hempsted Gratiot
By Archibald W Bell

UNITED STATES PATENT OFFICE.

EDWARD HEMPSTEAD GRATIOT, OF PLATTEVILLE, WISCONSIN.

IMPROVEMENT IN GRAIN-HEATERS.

Specification forming part of Letters Patent No. 197,464, dated November 27, 1877; application filed October 26, 1876.

*To all whom it may concern:*

Be it known that I, EDWARD H. GRATIOT, of Platteville, Grant county, and State of Wisconsin, have invented certain new and useful Improvements in Wheat or Grain Heaters for Milling Purposes; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to improvements in mills where wheat and other grain is ground for the purpose of making flour, and where a hopper or other similar device is used above the grinding-burrs.

My invention further relates to the heating or warming the grain to be ground into flour in a proper, even, and thorough manner, so that it will be in the best possible condition for grinding into flour, and to separate the hull or bran of the berry from the flour contained in the wheat or other grain ground by means of the heater and grain-mixers of the peculiar arrangement and construction set forth, the nature of which will be more fully explained by reference to the drawings annexed, in which—

Figure 1 represents a plan; Fig. 2, a sectional view, and so much of the mill-hopper as will illustrate my invention. Fig. 3 represents parts separately, and Fig. 4 a ground plan.

A represents the mill-hopper. B represents the heating-cylinder for steam or hot air. C represents grain receptacle or space; D, outer walls of grain-heater; E, connecting steam or hot-air pipe; F, exhaust-pipe from heating-cylinder; $e$, gage-cock to regulate supply of steam or hot air; $f$, gage-cock to exhaust-pipe; and G G', the grain-mixers.

The grain to be ground is poured into space C, and passes down over cylinder B, and between the grain-mixers G G', and is thence discharged into hopper A or other device to carry the grain to the grinding-burrs.

In passing down to the hopper the resistance the grain meets with from the grain-mixers G G' causes the grain to separate and mix itself thoroughly, and thereby become evenly and thoroughly heated and put in the best possible condition for grinding or milling purposes.

The miller being able, by means of the gage-cock $e$, to regulate the supply of heat for the different conditions his grain may be in, is, by the aid of my invention, enabled to grind grain in a good and satisfactory manner which would otherwise be difficult to work, and produce flour of full yield and the best quality, that would otherwise be deficient in both.

I claim as my invention—

1. The combination of the heating-cylinder B and the grain-mixers G G', substantially as and for the purposes hereinbefore set forth.

2. The combination of the heating-cylinder B, the connecting steam or hot-air pipe E, having gage-cock $e$, and the grain-mixers G G', substantially as and for the purpose hereinbefore set forth.

EDWARD HEMPSTEAD GRATIOT.

In presence of—
  NATHAN E. UTT,
  MAY E. BELL.